United States Patent
Chen (10) Patent No.: US 9,266,256 B2
(45) Date of Patent: Feb. 23, 2016

(54) CUTTER BLADE DRIVING AND POSITIONING CONTROL STRUCTURE FOR PLASTIC PELLETIZING MACHINE

(71) Applicant: SINO-ALLOY MACHINERY INC., Kuan-Yin estate, Taoyuan Hsien (TW)

(72) Inventor: Mei-Chuan Chen, Taoyuan Hsien (TW)

(73) Assignee: SINO-ALLOY MACHINERY INC., Taoyuan Hsien (TW)

( * ) Notice: Subject to any disclaimer, the term of this patent is extended or adjusted under 35 U.S.C. 154(b) by 277 days.

(21) Appl. No.: 14/025,690

(22) Filed: Sep. 12, 2013

(65) Prior Publication Data

US 2015/0072037 A1 Mar. 12, 2015

(51) Int. Cl.
*B23Q 5/04* (2006.01)
*B29B 9/06* (2006.01)
*B23Q 5/32* (2006.01)

(52) U.S. Cl.
CPC ... *B29B 9/06* (2013.01); *B23Q 5/04* (2013.01); *B23Q 5/32* (2013.01); *Y10T 408/73* (2015.01)

(58) Field of Classification Search
CPC .............. B23Q 5/04; B23Q 5/10; B23Q 5/28; B23Q 5/32; Y10T 408/73; Y10T 408/75; Y10T 408/665; Y10T 408/65; Y10T 408/675

USPC ............ 408/141, 142, 127, 124, 129; 425/67, 425/196, 311; 241/101.2
See application file for complete search history.

(56) References Cited

U.S. PATENT DOCUMENTS

| 3,676,029 | A | * | 7/1972 | Hopkin | 425/67 |
| 3,753,637 | A | * | 8/1973 | Gasior et al. | 425/313 |
| 3,803,927 | A | * | 4/1974 | Lawler | 74/89.31 |
| 4,500,271 | A | * | 2/1985 | Smith | 425/67 |
| 5,020,404 | A | * | 6/1991 | Hoeh | 83/298 |
| 5,190,768 | A | * | 3/1993 | Ishida et al. | 425/67 |
| 5,997,223 | A | * | 12/1999 | Kosmowski | 408/124 |
| 6,186,024 | B1 | * | 2/2001 | Leiber | 74/490.09 |
| 6,332,765 | B1 | * | 12/2001 | Spelleken | 425/67 |
| 7,273,365 | B2 | * | 9/2007 | Murb | 425/67 |
| 7,730,817 | B2 | * | 6/2010 | Rieck | 83/245 |
| 2008/0289440 | A1 | * | 11/2008 | Denk et al. | 74/89.34 |

\* cited by examiner

*Primary Examiner* — Daniel Howell
*Assistant Examiner* — Yasir Diab (57) ABSTRACT

A cutter blade driving and positioning control structure formed of a rotary drive, a transmission unit, a sliding unit, a linear motor and a cutter unit and used in a plastic pelletizing machine for making plastic pellets is disclosed. The rotary drive provides a rotary driving force for driving the transmission unit to rotate the cutter unit. The linear motor is adapted to reciprocate the transmission unit, moving the cutter unit back and forth rapidly with minimized energy consumption.

3 Claims, 8 Drawing Sheets

CUTTER BLADE DRIVING AND POSITIONING CONTROL STRUCTURE FOR PLASTIC PELLETIZING MACHINE

BACKGROUND OF THE INVENTION

1. Field of the Invention

The present invention relates to plastic pelletizing technology, and more particularly to a cutter blade driving and positioning control structure used in a plastic pelletizing machine for making plastic pellets, which moves and rotates the cutter unit of the plastic pelletizing machine rapidly and accurately, saving much energy consumption and prevents perforated plate damage due to an overpressure.

2. Description of the Related Art

A plastic pelletizing machine for making plastic pellets is known using a motor to rotate a cutter over the surface of a perforated plate, thereby cutting off the extruded plastic material into plastic pellets. However, because the plastic pelletizing machine must be wholly shifted to move the cutter into contact with the surface of the perforated plate before operation, the shifting apparatus adapted to shift the plastic pelletizing machine is heavy and has a large size. Further, the shifting apparatus consumes much power during operation and cannot move the plastic pelletizing machine back and forth rapidly.

SUMMARY OF THE INVENTION

The present invention has been accomplished under the circumstances in view. It is the main object of the present invention to provide a cutter transmission and control mechanism for plastic pelletizing machine, which moves and rotates the cutter unit of the plastic pelletizing machine rapidly and accurately, saving much energy consumption and prevents perforated plate damage due to an overpressure.

To achieve this and other object of the present invention, a cutter blade driving and positioning control structure of the invention is used in a plastic pelletizing machine for making plastic pellets. The cutter blade driving and positioning control structure comprises a rotary drive, a transmission unit, a sliding unit, a linear motor and a cutter unit. The rotary drive comprises a drive motor, and a driving shaft coupled to and rotatable by the drive motor. The driving shaft comprises a plurality of longitudinal coupling grooves equiangularly spaced around the periphery thereof. The transmission unit comprises a transmission shaft and a bearing block. The transmission shaft is a tubular shaft sleeved onto the driving shaft of the rotary drive and pivotally mounted in the bearing block, comprising a plurality of longitudinal coupling ribs equiangularly spaced around an inner perimeter thereof and respectively slidably coupled to the longitudinal coupling grooves of the driving shaft so that rotating the driving shaft causes rotation of the transmission shaft in the bearing block. The sliding unit is disposed at one lateral side relative to the driving shaft of the rotary drive, comprising a seat member and a sliding block. The sliding block has one side thereof slidably coupled to the seat member, and an opposite side thereof fixedly connected to the linking block of the transmission unit. The linear motor comprises a motor body affixed to the drive motor of the rotary drive, and an inductor connected to the bearing block of the transmission unit and adapted to move the bearing block alternatively back and forth relative to the motor body when activated. The cutter unit is connected to the transmission shaft of the transmission unit and rotatable and axially movable by the transmission unit.

DETAILED DESCRIPTION OF THE PREFERRED EMBODIMENT

Referring to FIGS. 1-6, a cutter blade driving and positioning control structure for plastic pelletizing machine in accordance with the present invention is shown. The cutter transmission and control mechanism comprises a rotary drive 1, a transmission unit 2, a sliding unit 3, a linear motor 4, and a cutter unit 5.

The rotary drive 1 comprises a motor 11, a driving shaft 12 coupled to and rotatable by the motor 11. The driving shaft 12 comprises a plurality of longitudinal coupling grooves 121 equiangularly spaced around the periphery thereof.

The transmission unit 2 comprises a transmission shaft 21, a bearing block 22, and a linking block 23. The transmission shaft 21 is a tubular shaft sleeved onto the driving shaft 12 of the rotary drive 1 and pivotally mounted in the bearing block 22, comprising a plurality of longitudinal coupling ribs 211 equiangularly spaced around an inner perimeter thereof and respectively slidably coupled to the longitudinal coupling grooves 121 of the driving shaft 12. Thus, rotating the driving shaft 12 can rotate the transmission shaft 21 in the bearing block 22. Further, the bearing block 22 is connected to the linking block 23.

The sliding unit 3 is disposed at one lateral side relative to the driving shaft 12 of the rotary drive 1, comprising a seat member 31 and a sliding block 32. The sliding block 32 has its one side, namely, the bottom side slidably coupled to the seat member 31 and its opposite side, namely, the top side fixedly connected to the linking block 23 of the transmission unit 2. Further a sensor 33 is mounted at one side of the seat member 31 and adapted to detect the sliding distance of the sliding block 32.

The linear motor 4 comprises a motor body 41 affixed to the motor 11 of the rotary drive 1, and an inductor 42 connected to the bearing block 22 of the transmission unit 2 and adapted to move the bearing block 22 alternatively back and forth relative to the motor body 41 when activated.

The cutter unit 5 comprises a coupling shaft 51, a cutter holder 52, a spring member 53, a plurality of cutter blades 54, a locating member 55, and a plug member 56. The coupling shaft 51 is a tubular shaft axially slidably sleeved onto the driving shaft 12 of the rotary drive 1 and fixedly connected to the transmission shaft 21 of the transmission unit 2, comprising a plurality of axial coupling teeth 511 equiangularly spaced around an outer perimeter of a front end thereof. The cutter holder 52 comprises an accommodation hole 521 axially disposed in one end thereof, a displacement hole 523 axially disposed in an opposite end thereof in communication with the accommodation hole 521, and a plurality of axial coupling grooves 522 equiangularly spaced around an inner perimeter thereof within the accommodation hole 521 and axially slidably coupled to the axial coupling teeth 511 of the coupling shaft 51. The spring member 53 is mounted in the accommodation hole 521 and stopped with its one end against an inside wall of the cutter holder 52 between the accommodation hole 523 and the displacement hole 521 and its other end against the front end of the coupling shaft 51. The locating member 55 is movably mounted in the displacement hole 523 and inserted through the spring member 53 into the accommodation hole 521. The cutter blades 26 are affixed to one end of the locating member 55 outside the cutter holder 52 and rotatable and axially movable with the locating member 55. The plug member 56 is mounted in the accommodation hole 521 of the cutter holder 52 around the locating member 55 and connected to the coupling shaft 51 for enabling the locating member 55 to be rotated with the coupling shaft 51.

Referring to FIGS. 1-7, during operation of the plastic pelletizing machine, the motor 11 of the rotary drive 1 is controlled to rotate the driving shaft 12, thereby rotating the transmission shaft 21 of the transmission unit 2 and the coupling shaft 51 of the cutter unit 5. When going to move the cutter blade 54 of the cutter unit 5 into contact with the plastic pelletizing machine's perforated plate 6, the inductor 42 of the linear motor 4 is activated to move in direction away from the motor body 41 of the linear motor 4, thereby carrying the bearing block 22 in direction toward the perforated plate 6. When the bearing block 22 is moved in direction toward the perforated plate 6, the transmission shaft 21 is carried by the bearing block 22 to move the cutter unit 5 toward the perforated plate 6, forcing the cutter blade 54 into contact with the plastic pelletizing machine's perforated plate 6. Further, during movement of the bearing block 22, the sliding block 32 is moved relative to the seat member 31 that guides the sliding movement of the sliding block 32 accurately toward the perforated plate 6 within a predetermined range. Subject to the detection of the sensor 33 at the seat member 31, the moving distance of the sliding block 32 is accurately measured, and thus the displacement of the sliding block 32 can be accurately controlled.

Figure 1:
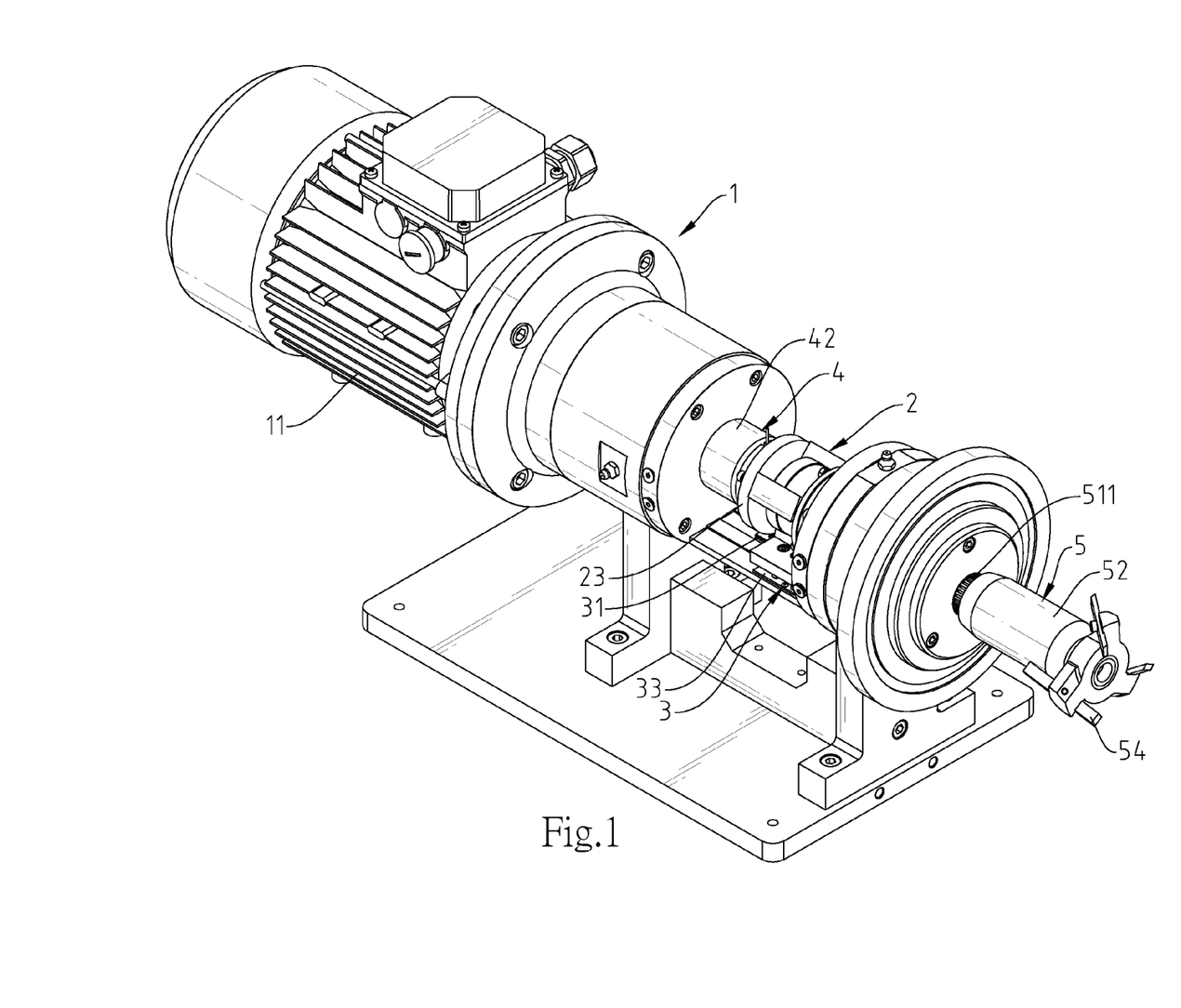
FIG. 1 is an oblique top elevational view of a cutter blade driving and positioning control structure used in plastic pelletizing machine in accordance with the present invention.
Figure 2:
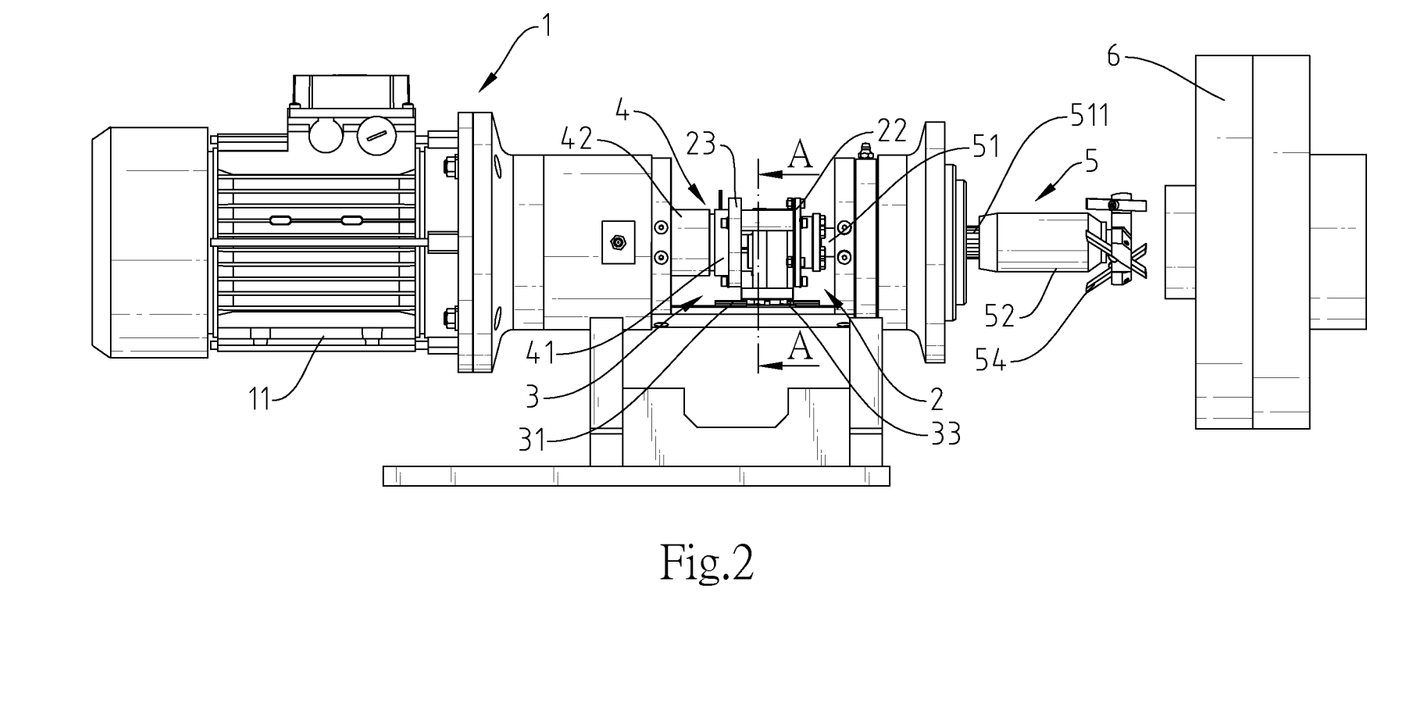
FIG. 2 is a side view of the cutter blade driving and positioning control structure in accordance with the present invention.
Figure 3:
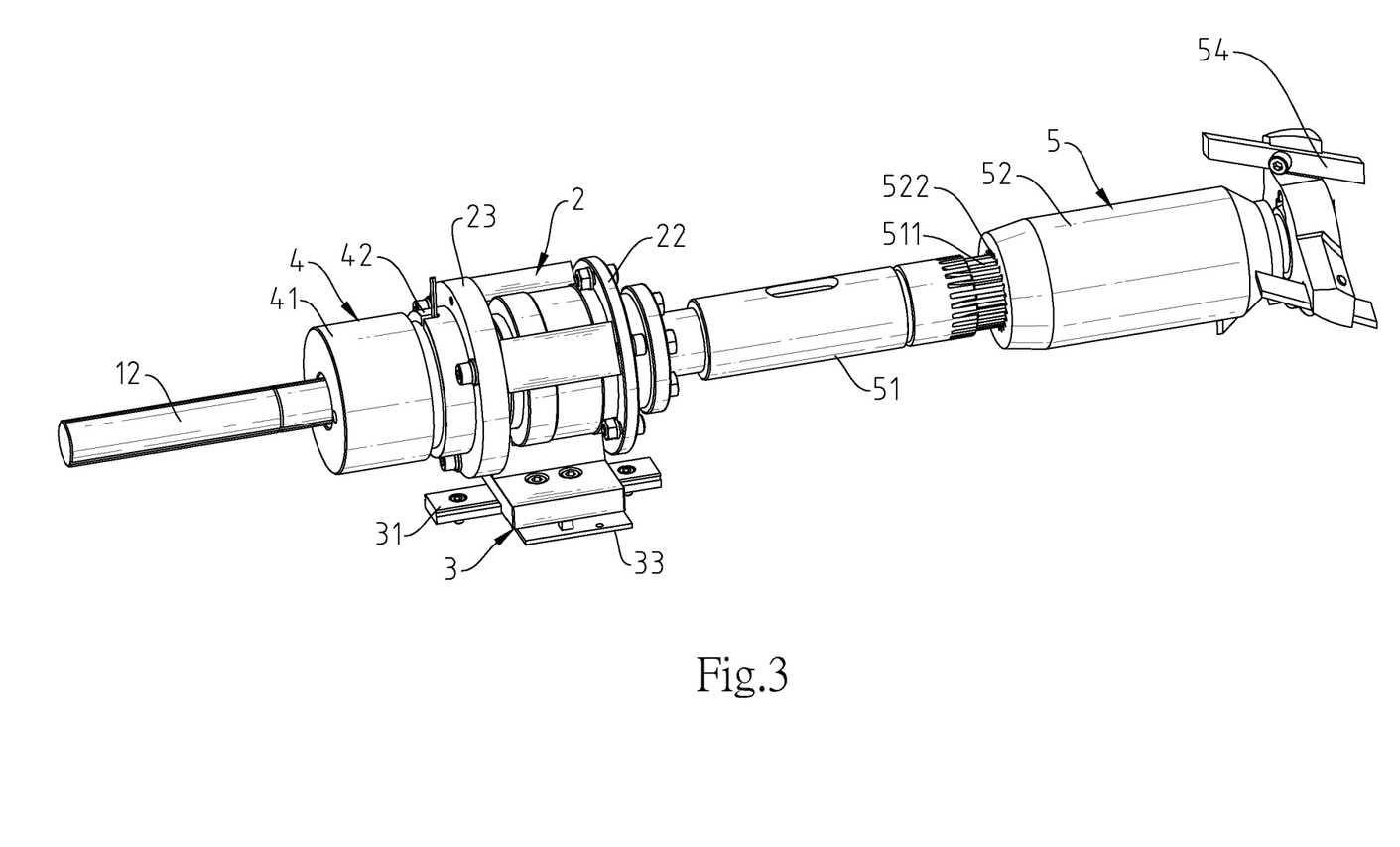
FIG. 3 is an elevational view of a part of the cutter blade driving and positioning control structure in accordance with the present invention.
Figure 4:
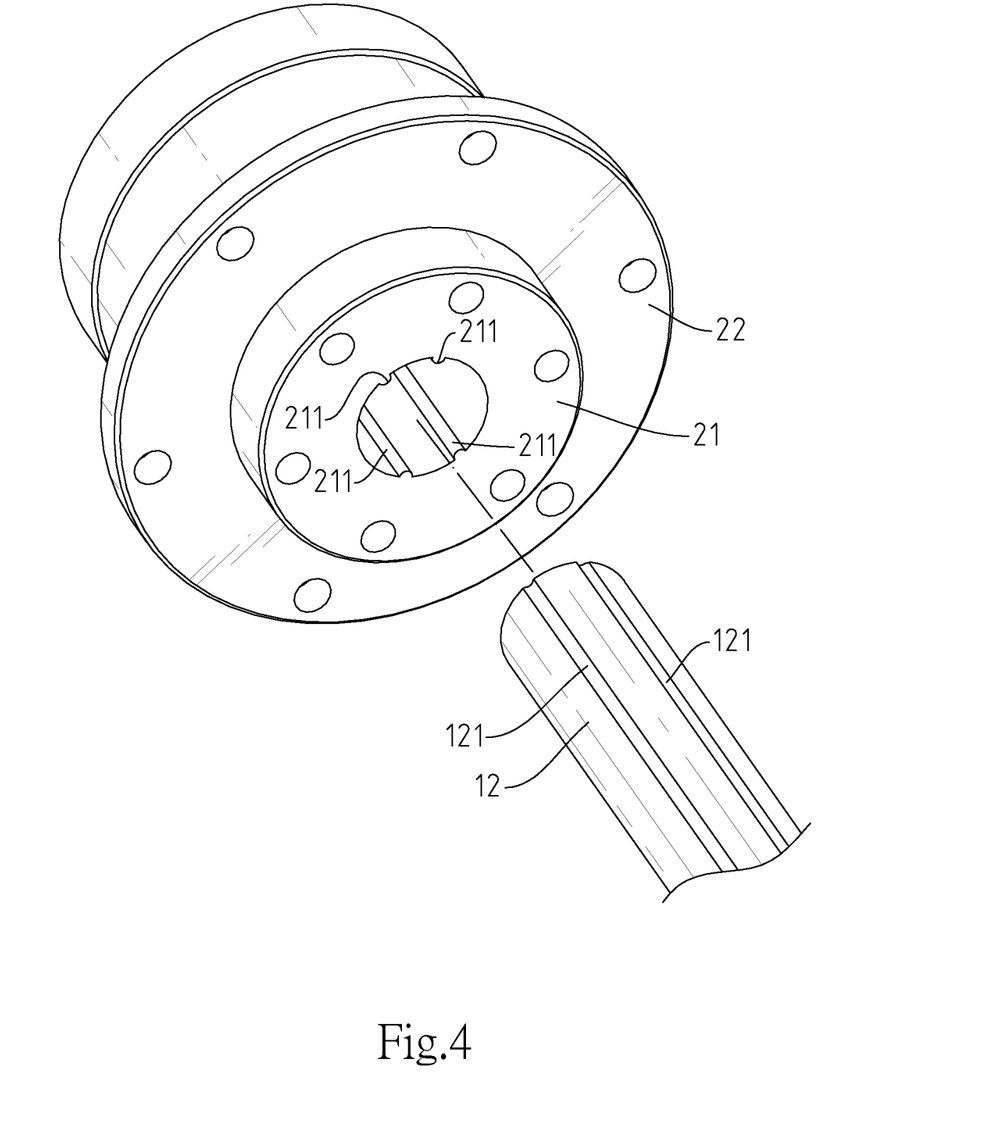
FIG. 4 is an exploded view in an enlarged scale of a part of the cutter blade driving and positioning control structure in accordance with the present invention.
Figure 5:
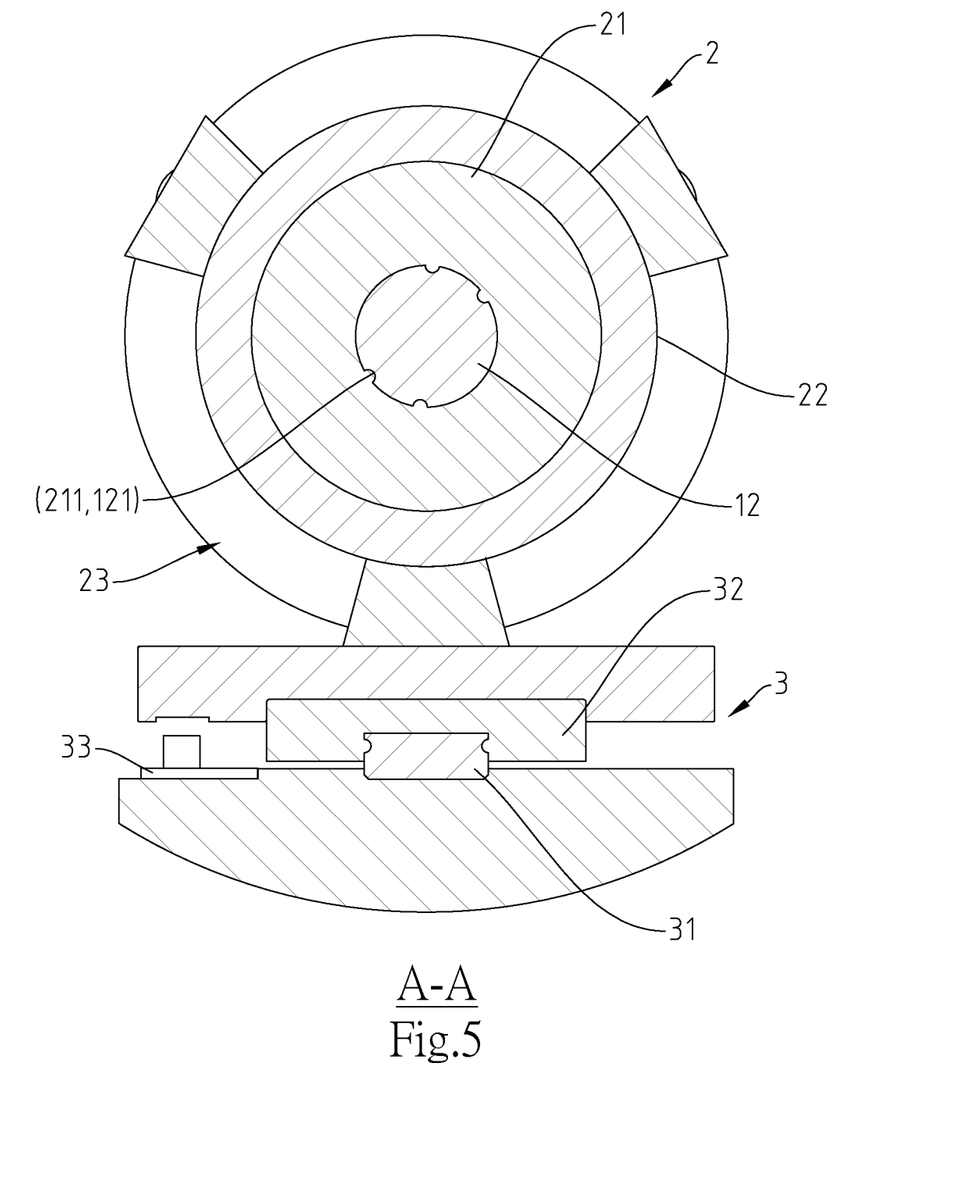
FIG. 5 is a sectional view taken along line A-A of FIG. 2.
Figure 6:
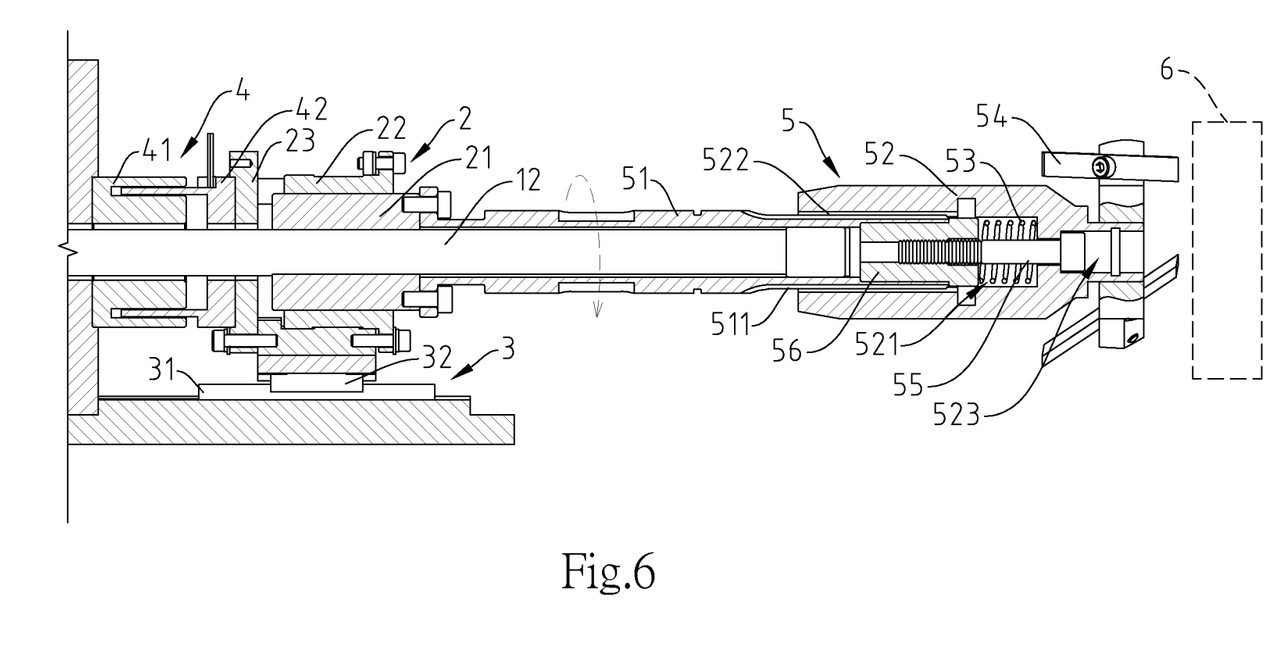
FIG. 6 is a schematic sectional view illustrating the operation of the present invention (I).
Figure 7:
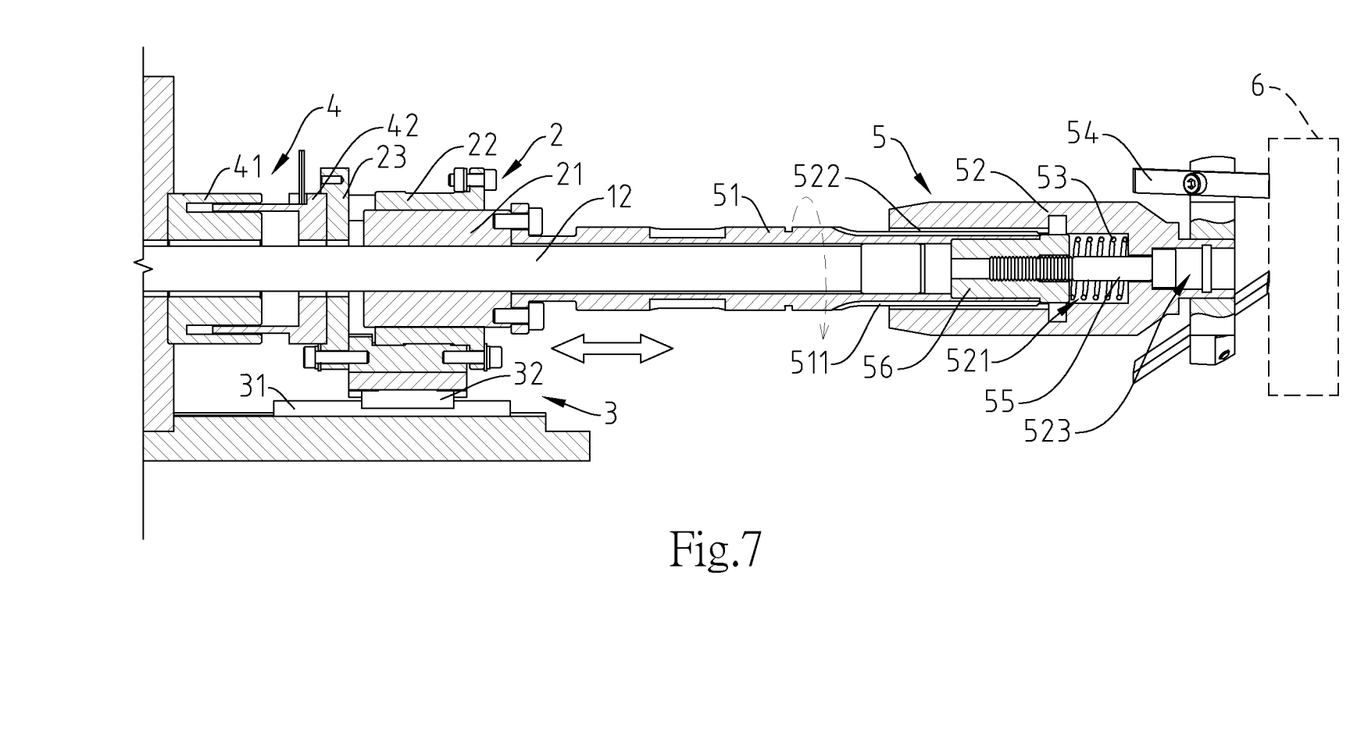
FIG. 7 is a schematic sectional view illustrating the operation of the present invention (II).
Figure 8:
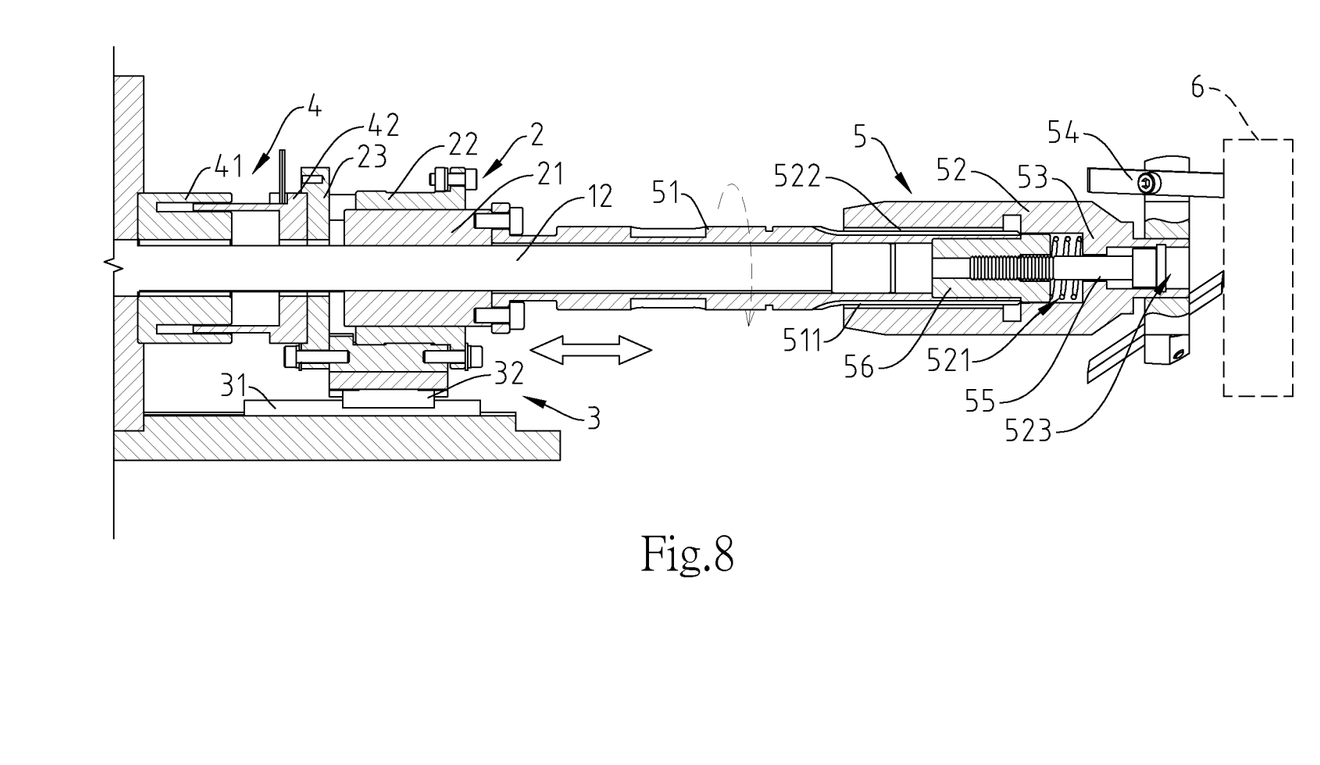
FIG. 8 is a schematic sectional view illustrating the operation of the present invention (III).

Referring to FIG. 8, when the inductor 42 of the linear motor 4 moves the bearing block 22 toward the perforated plate 6, the coupling shaft 51 will be moved to force the spring member 53 against the cutter holder 52. If the inductor 42 keeps moving the coupling shaft 51 toward the perforated plate 6 after contact between the cutter blade 54 of the cutter unit 5 and the surface of the perforated plate 6, the spring member 53 will be compressed to compensate the displacement of the coupling shaft 51, preventing perforated plate damage due to an overpressure.

In general, the technical feature of the present invention is the arrangement of the transmission unit 2 to rotate the cutter unit 5 and the arranged of the linear motor 4 to move the transmission unit 2 alternatively back and forth, enabling the cutter unit 5 to be moved back and forth rapidly, saving energy consumption in displacement of the cutter unit 5.

What the invention claimed is:

1. A cutter blade driving and positioning control structure for a plastic pelletizing machine, comprising:
   a rotary drive comprising a drive motor, a driving shaft coupled to and rotatable by said drive motor, said driving shaft comprising a plurality of longitudinal coupling grooves equiangularly spaced around a periphery thereof;
   a transmission unit comprising a transmission shaft and a bearing block, said transmission shaft being a tubular shaft sleeved onto said driving shaft of said rotary drive and pivotally mounted in said bearing block, said transmission shaft comprising a plurality of longitudinal coupling ribs equiangularly spaced around an inner perimeter thereof and respectively slidably coupled to said longitudinal coupling grooves of said driving shaft so that rotating said driving shaft causes rotation of said transmission shaft in said bearing block;
   a sliding unit disposed at one lateral side relative to said driving shaft of said rotary drive, said sliding unit comprising a seat member and a sliding block, said sliding block having one side thereof slidably coupled to said seat member and an opposite side thereof fixedly connected to said bearing block of said transmission unit;
   a linear motor comprising a motor body affixed to said drive motor of said rotary drive, and an inductor connected to said bearing block of said transmission unit and adapted to move said bearing block alternatively back and forth relative to said motor body when activated; and
   a cutter unit connected to said transmission shaft of said transmission unit and rotatable and axially movable by said transmission unit, the cutter unit comprising:
   a coupling shaft,
   a locating member, and
   a cutter holder,
   wherein said coupling shaft is a tubular shaft axially slidably sleeved onto said driving shaft of said rotary drive and fixedly connected to said transmission shaft of said transmission unit, said coupling shaft comprising a plurality of axial coupling teeth equiangularly spaced around an outer perimeter of a front end thereof,
   said cutter holder comprises an accommodation hole axially disposed in one end thereof and a displacement hole axially disposed in an opposite end, a plurality of axial coupling grooves equiangularly spaced around an inner perimeter of the cutter holder within said accommodation hole and axially slidably coupled to said axial coupling teeth of said coupling shaft, the displacement hole in communication with said accommodation hole, and
   the locating member is movably mounted in said displacement hole and inserted through into said accommodation hole and positioned in said coupling shaft.

2. The cutter blade driving and positioning control structure as claimed in claim 1, wherein said cutter unit further comprises a plug member connected to said coupling shaft to secure said locating member.

3. The cutter blade driving and positioning control structure as claimed in claim 1, wherein said transmission unit further comprises a linking block connected between said bearing block and said sliding block of said sliding unit.

* * * * *